United States Patent
Saini et al.

(10) Patent No.: US 11,968,211 B2
(45) Date of Patent: Apr. 23, 2024

(54) CONTROLLING ACCESS ENTITLEMENT FOR NETWORKING DEVICE DATA

(71) Applicant: Cisco Technology, Inc., San Jose, CA (US)

(72) Inventors: Vinay Saini, Karnataka (IN); Robert E. Barton, Richmond (CA); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 408 days.

(21) Appl. No.: 17/476,864

(22) Filed: Sep. 16, 2021

(65) Prior Publication Data
US 2023/0085382 A1 Mar. 16, 2023

(51) Int. Cl.
*H04L 9/40* (2022.01)
(52) U.S. Cl.
CPC .......... *H04L 63/101* (2013.01); *H04L 63/102* (2013.01); *H04L 63/107* (2013.01); *H04L 63/20* (2013.01)
(58) Field of Classification Search
CPC ... H04L 63/101; H04L 63/102; H04L 63/107; H04L 63/20
See application file for complete search history.

(56) References Cited

U.S. PATENT DOCUMENTS

| | | | |
|---|---|---|---|
| 10,375,114 B1 * | 8/2019 | Gu | G06F 21/604 |
| 10,819,707 B1 | 10/2020 | Sokolov et al. | |
| 2013/0160072 A1 * | 6/2013 | Reus | H04L 63/102 |
| | | | 726/1 |
| 2016/0283406 A1 * | 9/2016 | Linga | H04L 63/0428 |
| 2016/0292694 A1 * | 10/2016 | Goldschlag | H04L 63/20 |
| 2016/0344736 A1 * | 11/2016 | Khait | H04L 63/102 |
| 2017/0237747 A1 * | 8/2017 | Quinn | G06F 21/602 |
| | | | 726/29 |
| 2019/0273746 A1 * | 9/2019 | Coffing | G06Q 20/40 |
| 2020/0028853 A1 | 1/2020 | Ford et al. | |
| 2021/0058383 A1 * | 2/2021 | Colon | H04W 4/029 |
| 2022/0116404 A1 * | 4/2022 | Manasse | H04L 63/1433 |

OTHER PUBLICATIONS

Claudio A. Ardagna et al, Supporting Location-based Conditions in Access Control Policies, ACM (Year: 2006).*
Bodyguard, "About US," https://www.bodyguard.ai/about-us, retrieved Sep. 2, 2021, 6 pages.

(Continued)

*Primary Examiner* — Shanto Abedin
(74) *Attorney, Agent, or Firm* — Edell, Shapiro & Finnan, LLC

(57) ABSTRACT

Techniques are provided for controlling access entitlement for networking device data. In one example, a geographic location of a networking device is determined. A request to access data associated with the networking device is obtained from a user device. A user parameter of a user associated with the user device is determined. An access policy that controls access to the data based on the geographic location of the networking device and the user parameter is identified. The request to access the data is permitted or denied based on the geographic location of the networking device, the user parameter, and the access policy.

20 Claims, 5 Drawing Sheets

(56) References Cited

OTHER PUBLICATIONS

Wikipedia, "Borda count," https://en.wikipedia.org/wiki/Borda_count, retrieved Sep. 2, 2021, 8 pages.
Skyhook, "Solutions: Location Infrastructure Analytics," https://www.skyhook.com/location-infrastructure-analytics-solutions, retrieved Aug. 19, 2021, 8 pages.
Skyhook, "Solutions: Contextual Location," https://www.skyhook.com/contextual-location-solutions, retrieved Aug. 19, 2021, 9 pages.
Skyhook, "Solutions: LPWAN Location," https://www.skyhook.com/lpwan-location-solutions, retrieved Aug. 19, 2021, 8 pages.
Skyhook, "Solutions: Offline Location," https://www.skyhook.com/offline-location-solutions, retrieved Aug. 19, 2021, 8 pages.
Skyhook, "Solutions: Indoor Location," https://www.skyhook.com/indoor-location-solutions, retrieved Aug. 19, 2021, 9 pages.
Skyhook, "Solutions: Emergency Location," https://www.skyhook.com/emergency-location-solutions, retrieved Aug. 19, 2021, 9 pages.
Skyhook, "Solutions: Hybrid Location," https://www.skyhook.com/hybrid-location-solutions, retrieved Aug. 19, 2021, 8 pages.
Skyhook, "Solutions: Cellular Positioning," https://www.skyhook.com/cellular-positioning-solutions, retrieved Aug. 19, 2021, 9 pages.
Skyhook, "Solutions: Wi-Fi Location," https://www.skyhook.com/wifi-location-solutions, retrieved Aug. 19, 2021, 9 pages.
Wikipedia, "Condorcet method," https://en.wikipedia.org/wiki/Condorcet_method, retrieved Aug. 18, 2021, 20 pages.

* cited by examiner

CONTROLLING ACCESS ENTITLEMENT FOR NETWORKING DEVICE DATA

TECHNICAL FIELD

The present disclosure relates to computer networking.

BACKGROUND

Data sovereignty requirements—which govern where and/or how data can be stored—are quickly being adopted by various entities (e.g., governments and private companies). These data sovereignty requirements often vary with geographic region (e.g., country, province, etc.). Furthermore, many of the entities that must adhere to these requirements use networking devices located throughout the world. These entities will continue to have increasingly complex security and access requirements.

DESCRIPTION OF EXAMPLE EMBODIMENTS

Overview

Techniques are provided herein for controlling access entitlement for networking device data. In one example embodiment, a geographic location of a networking device is determined. A request to access data associated with the networking device is obtained from a user device. A user parameter of a user associated with the user device is determined. An access policy that controls access to the data based on the geographic location of the networking device and the user parameter is identified. The request to access the data is permitted or denied based on the geographic location of the networking device, the user parameter, and the access policy.

Example Embodiments

Figure 1:
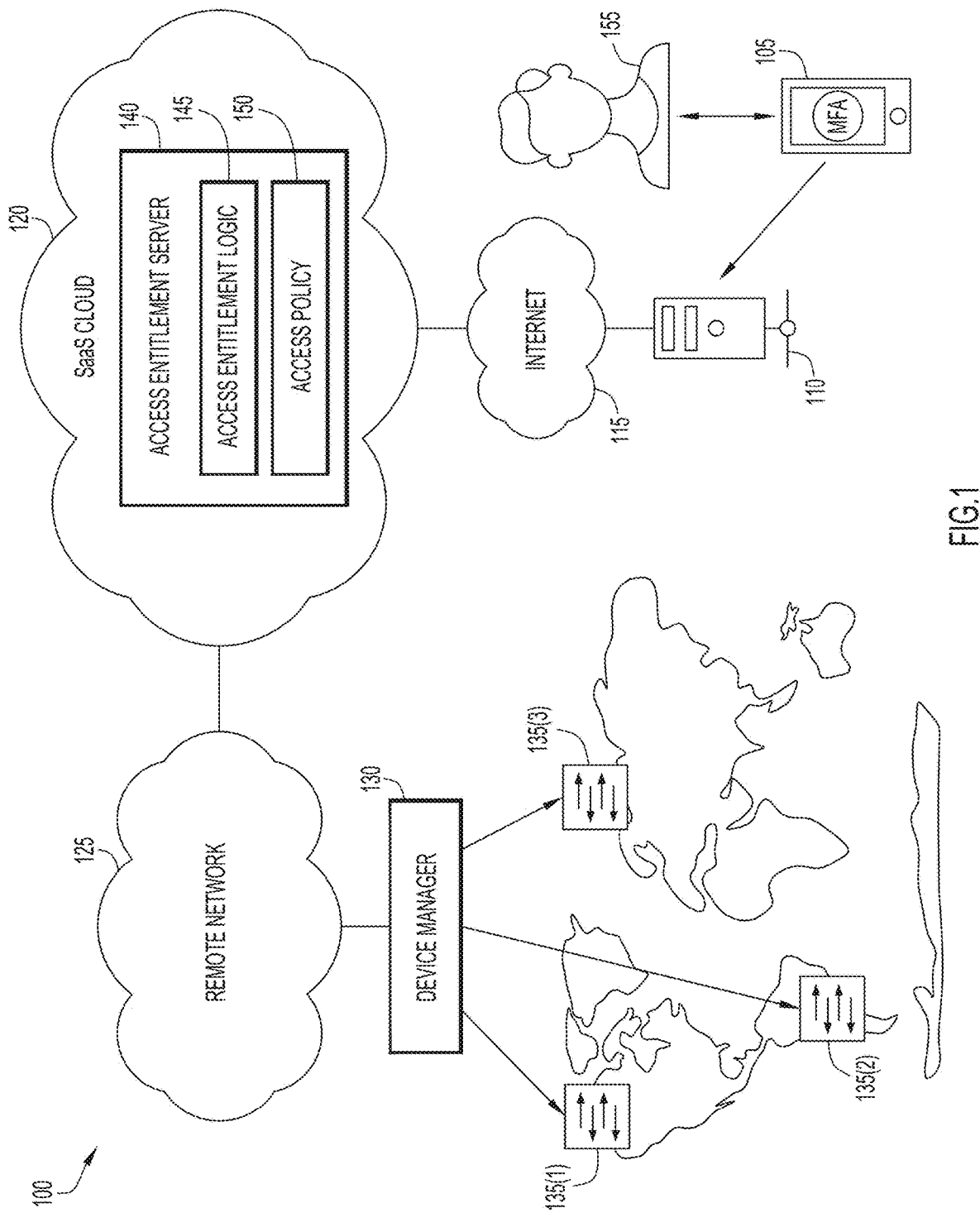
FIG. 1 illustrates a system configured to control access entitlement for networking device data, according to an example embodiment.

FIG. 1 illustrates an example system 100 configured to control access entitlement for networking device data. System 100 includes user device 105, Multi-Factor Authentication (MFA) server 110, Internet 115, and Software as a Service (SaaS) cloud 120. SaaS cloud 120 includes access entitlement server 140. System 100 further includes remote network 125, device manager/controller 130 (e.g., hosted on one or more servers), and networking devices 135(1)-135(3). Networking devices 135(1)-135(3) may include any suitable networking devices (e.g., switches, routers, etc.), and may be geographically dispersed. While three networking devices 135(1)-135(3) are shown in the example of FIG. 1, it will be appreciated that techniques described herein may be compatible with any suitable number of networking devices.

Conventional approaches struggle to provide access control for geographically dispersed networking devices, particularly in view of increasingly complex data sovereignty requirements. For example, given various country-specific laws related to data and service access based on complex entitlement needs, conventional approaches cannot adequately handle entities with offices around the world. Such entities have networking devices physically located in different countries, requiring adherence to the various corresponding national data sovereignty policies. Conventional techniques are ill-equipped to align network management with data sovereignty policies by permitting users in certain countries to work on networking devices only where allowed by data sovereignty rules.

This problem is complicated even further by Virtual Private Networks (VPNs). VPNs can be used to access parts of a network by giving the appearance that a user is in one location (e.g., country), when in reality the user is in another location. For example, many video streaming services offer content unique to a given geographic region based on where the video streaming services are licensed to stream that content. However, a user can easily bypass location requirements with a VPN to give the appearance that the user is in a location where the desired content is offered.

Accordingly, access entitlement server 140 is provided that is configured with access entitlement logic 145. Access entitlement logic 145 causes access entitlement server 140 to control access entitlement for data associated with networking devices 135(1)-135(3) in accordance with operations described herein. Access entitlement logic 145, or portions of access entitlement logic 145, may be located on any suitable networking entity(ies), such MFA server 110, SaaS cloud 120, device manager 130, and/or access entitlement server 140.

In one example, device manager 130 may identify the respective geographic locations of networking devices 135(1)-135(3). For instance, device manager 130 may maintain the respective geographic locations of networking devices 135(1)-135(3) and various services during deployment. Device manager 130 may assign location labels to networking devices 135(1)-135(3) and provide the location labels to access entitlement server 140 via remote network 125. The location labels may indicate the respective geographic locations of networking devices 135(1)-135(3). Access entitlement server 140 may determine the respective geographic locations of networking devices 135(1)-135(3) based on the location labels. It will be appreciated that access entitlement server 140 or any other suitable network entity may determine the respective geographic locations of networking devices 135(1)-135(3) using any suitable techniques, such as by obtaining indications of the respective geographic locations directly from networking devices 135(1)-135(3).

Device manager 130 and/or access entitlement server 140 may group/classify networking devices 135(1)-135(3) based on geographic region. The geographic region may be an access entitlement region that has a unique set of networking device/data access policies. The geographic region may be government-mandated or entity-specific. The specific entity may include any suitable organization, enterprise, corporation, government, company, etc.

Device manager 130 may further dynamically auto-generate respective Location-Based Access Criticality (LBAC)

labels for networking devices 135(1)-135(3). The LBAC labels may be unique labels that indicate respective target access control levels for networking devices 135(1)-135(3). For example, a first target access control level may permit many users to access networking device 135(1), a second target access control level may permit relatively few users to access networking device 135(2), and a third target access control level may permit a moderate number of users to access networking device 135(3).

In one example, device manager 130 may dynamically auto-generate the respective LBAC labels based on the respective topological locations of networking devices 135(1)-135(3) in one or more networks. A topological location refers to where in the network topology as networking devices resides (such as in terms of neighboring, next hop devices, etc.). Device manager 130 may auto-label networking devices 135(1)-135(3) for criticality of operations performed by networking devices 135(1)-135(3). The auto-labeling may be based on the roles/types of networking devices 135(1)-135(3) in the one or more networks/topologies. For instance, core switches may have higher criticality than access switches within a network because core switches may handle highly-sensitive, global network traffic. As a result, device manager 130 may assign LBAC labels indicating a higher target access control level for core switches than for access switches. Thus, LBAC labels may represent a level of security to be associated with a given networking device based on the topological location of the networking device in a network. In one example, the LBAC labels may include an indication of device sensitivity on a scale from one to ten.

Device manager 130 may share the LBAC labels with access entitlement server 140 directly or via integration with SaaS cloud 120. As a result, access entitlement server 140 may obtain the LBAC labels from device manager 130. However, access entitlement server 140 may obtain the LBAC labels using any suitable techniques; for example, access entitlement server 140 may bypass device manager 130 to classify networking devices 135(1)-135(3) by auto-generating the LBAC labels and assigning the LBAC labels to networking devices 135(1)-135(3).

Access entitlement server 140 may store access policy 150. Access policy 150 may include custom, entity-defined rules that control when/which users can access data associated with networking devices 135(1)-135(3). Access policy 150 may be a target management location policy based on a target location (e.g., a location of networking device 135(1)) and current user location. Access policy 150 may be based on any suitable parameter, and the number/types of parameters may be customizable by the entity. Access policy 150 may pertain to one or more specific countries/regions/entities/etc.

In one example, access policy 150 may be based on one or more access entitlement characteristics of networking devices 135(1)-135(3), such as configurations of networking devices 135(1)-135(3), location labels of networking devices 135(1)-135(3), the LBAC labels of networking devices 135(1)-135(3), the location of data associated with networking devices 135(1)-135(3), etc. For example, access entitlement server 140 may map the location of each networking device 135(1)-135(3) to access policy 150. In another example, access policy 150 may be based on user parameters/characteristics defining which users are permitted access. Examples of user parameters include the physical location or citizenship of the user requesting access, user identity, user credential strength, etc. In still another example, access policy 150 may be based on a third-party rule(s) database (e.g., a third-party regulatory policy engine) that provides policies defined by third-parties (e.g., regional data sovereignty laws).

SaaS cloud 120 may provide a user interface tool/portal that permits a network administrator of the entity to create/define access policy 150. For example, an entity may define access policy 150 to control access to data associated with networking devices 135(1)-135(3) (e.g., networking device configuration). Any suitable mechanism may be used to enable entities to consume LBAC labels to define general or intent-based policies. For example, the user interface may display various options for defining access policy 150 in a drop-down menu or any other suitable format. Or, network administrator may manually mark/select/tag one or more of networking devices 135(1)-135(3) with access entitlement characteristics.

SaaS cloud 120 and/or access entitlement server 140 may parse entity selections of access policy 150 and convert the entity selections into a format suitable for consumption by access entitlement server 140. Access entitlement server 140 may process inputs from the entity, device manager 130, and/or a third-party rule database to generate access policy 150. Access policy 150 may include any suitable rules such as government laws, local company policies, rules for sub-contracted companies, etc. Specific examples of access policy 150 are:

- Access to sensitive networking devices in a network must be provided to specific engineers from a specific third-party company based on local and company policies.
- Citizenship from a specific country is required for a user to design and manage a particular network or set of networking devices within a network.
- Access to networking device configuration and other critical documents can be accessed only by trusted users based on user location and citizenship.
- An engineer must be physically located in the United States of America (USA) to access internal networking devices for the USA federal government.
- Any device in a Toronto-based data center can be accessed only by a user in North America.
- For a defense organization where network access and configuration rules are created for an entire region, any networking device in Germany can only be accessed by German citizens located in Germany.
- A core router in Germany can only be accessed by German citizens located in Germany, whereas an access switch in the USA can be accessed by USA or Canadian citizens located anywhere in the world.
- Core switches require both user location and citizenship verification.
- A core device and its configuration can be accessed by employees of a partner company who have American citizenship and a local presence.
- A network fabric in Canada that serves the Canadian armed forces may only be managed by authorized individuals who are physically present at a known military base.
- To access an access switch, the user must be a USA citizen, but to access a core switch, the user must be a USA citizen, physically located in the USA during access, and an employee of a specific contractor.

User 155 may cause user device 105 to send a request to access data associated with one or more of networking devices 135(1)-135(3) (e.g., networking device 135(1)). The request may include a request to access (e.g., manage) networking devices 135(1)-135(3), configurations of networking devices 135(1)-135(3), one or more services, etc.

Access entitlement server 140 (and/or any other suitable network entity such as MFA server 110 or an Authentication, Authorization, and Accounting (AAA) server) may obtain the request and authenticate user 155 against a directory store for identification/validation and/or additional information (e.g., user parameters). Access entitlement server 140 may determine a user parameter of user 155, such as a citizenship of user 155. One or more user parameters applied and used by access entitlement server 140 may be integrated into active directories that may be referenced by the AAA server and/or access entitlement server 140 for use in authorization. Thus, access entitlement server 140 may interface with one or more identity servers (e.g., AAA server) for user validation and enable the addition of customized parameters in the authorization.

In one example, an MFA-based authentication system may obtain input from user device 105 to help authenticate user device 105. MFA server 110 may help authenticate user 155 by requesting/fetching user parameters such as the geographic location of user 155. For instance, access entitlement server 140 may obtain an indication of the geographic location of user 155 from an MFA process (e.g., MFA server 110). More specifically, in response to the request from user device 105, MFA server 110 may send a push notification to user device 105 with a request for geographic location information. An MFA agent (e.g., a plugin) on user device 105 may access the geographic location information of user device 105 and relay the geographic location information to MFA server 110 as part of the push notification response. The push notification response may also/alternatively include information input by user 155 into user device 105.

The geographic location information of user device 105 may include Global Positioning System (GPS) data, cellular location data (e.g., cellular triangulation, the cellular global identity of the cellular tower to which user device 105 is connected, cell/antenna identifier, etc.), footprint location database information/services (e.g., crowd-sourced location evaluation data), dead-reckoning inertial sensors, Access Points (APs) identifiers (e.g., AP Media Access Control (MAC) addresses), Long-Term Evolution (LTE) Positioning Protocol (LPP) values, Fine Time Measurement (FTM) values, etc. The geographic location information may include any suitable data.

Because individual location values can be attacked (e.g., GPA poisoning or spoofing), the MFA agent may collect geographic location information from a plurality of sources and provide, to access entitlement server 140, a corresponding plurality of candidate geographic locations of user 155. Access entitlement server 140 may obtain the plurality of candidate geographic locations of user 155, compare each of the plurality of candidate geographic locations against each other candidate geographic location, and derive the geographic location of user 155.

Any suitable network entity, such as the MFA agent and/or MFA server 110, may also/alternatively perform these operations. For example, the MFA agent may parse through the candidate geographic location values returned, and adopt the values that are most commonly returned by the various sources. The MFA agent may also return a failure notice if no common values are observed. MFA server 110 may contact access entitlement server 140, share the location of user 155, and/or reference access policy 150 based on the location of user 155. As shown in FIG. 1, access entitlement server 140 may be a standalone server in SaaS cloud 120 that is integrated with an MFA process; alternatively, access entitlement server 140 may be integrated directly with MFA server 110. Other embodiments may be envisioned.

A specific example for deriving the geographic location of user 155 from multiple candidate geographic locations is provided as follows. In this example, the candidate geographic locations include a series of GPS values, a series of LTE LPP values, a series of values through FTM, and one or more crowd-sourced evaluations. Each location value may be a set of latitude and longitude coordinates. The values may be retained for a given interval (e.g., a time window of five seconds).

A first candidate geographic location, provided by a first source, may be a=(3,5); a second candidate geographic location, provided by the first source (within the given interval), may be b=(5,5); a third candidate geographic location, provided by a second source, may be c=(3,2); and a fourth candidate geographic location, provided by a third source, may be d=(3,4). Each candidate geographic location is compared against every other candidate geographic location. Taking d=(3,4), for example, a=(3,5), b=(5,5), and c=(3,2) are subtracted from d=(3,4) to arrive at a set of differences between d and a, b, and c. The resulting set of differences is d−a=(0,−1), d−c=(−2,−1), and d−c=(0,2). Although this example uses coordinate differences, the distance to the point may be computed, e.g., using a Pythagorean transformation.

Table 1 below illustrates the results of the differences comparison in the form of a matrix. A value of 1 indicates that the corresponding candidate geographic location in the left-most column is closer to d than the corresponding candidate geographic location in the top row. As shown, a is closer to d than both b and c; b is further from d than both a and c; and c is further from d than a but closer than b. As a result, a is the closest to d, followed by c, and then b. The ranked list of differences for candidate geographic location d may be a in first, c in second, and b in third. The absolute values of the differences may be used to arrive at Table 1.

TABLE 1

|   | a | b | c |
|---|---|---|---|
| a | — | 1 | 1 |
| b | 0 | — | 0 |
| c | 0 | 1 | — |

This process may be repeated for each of candidate geographic locations a, b, and c by ranking all the other candidate geographic locations based on their respective distances to the chosen candidate geographic location. A ranked list may be compiled for each candidate geographic location a, b, c, and d. A Condorcet table may be built by adding votes from each of the ranked lists together to provide a sum of votes, where each vote represents the proximity of the other candidate locations to the current location being examined. At each iteration of adding the votes to the Condorcet table, the entry for the candidate geographic location that is being compared to the other candidate geographic locations may be missing. In that case, the vote for that candidate geographic location may be counted as zero. Candidate geographic locations that are close to many other candidate geographic locations may receive high scores, and candidate geographic locations that are far from many other candidate geographic locations may receive low scores.

The geographic location of user 155 may be derived/estimated/selected from the Condorcet table by selecting the location with the highest corresponding vote count. The Condorcet table may rank the locations that are closest to one another, and the winner may be the location that has the highest count of votes (e.g., the location that is closest (or equal) to the largest number of other location values returned by the different location sources. Thus, the Condorcet table may provide the winner, and the location provided by the winner may be considered the geographic location of user 155.

This process may reveal nodules/groups of candidate geographic locations that have high scores relative to each other, but have low scores relative to the other candidate geographic locations. This may signify that the candidate geographic locations form geographic clusters where user device 105 might be located. For example, all GPS and LPP values might be accurate, but the LPP values might be systematically biased in one direction (e.g., because a cell tower has an inaccurate configuration). This process may enable checking whether sets of candidate geographic locations that are coherent with each other are also coherent with the other candidate geographic locations. Thus, static error may be distinguished from dynamic error. In one example, a reverse bias may be applied and the Condorcet table may be recomputed to compensate for the error.

In a real-world deployment, {latitude, longitude} coordinate values may have nine digits after the period. As a result, the difference computation may occur at that scale (e.g., having nine digits after the period) rather than at the integer scale. Also, some inaccuracies in the measurements may be considered acceptable. If a {latitude, longitude} coordinate value has nine possible digits (xx.xxxxxxxxx), seven or eight digit values may be acceptable. Therefore, it may be possible to obtain two different measurements for the same location from the same technique. It may also be possible to obtain the same measurements for the same location from different techniques (at the accepted accuracy scale). In that case, both measurements may win against each other. For example, if F and G have the same location, F wins against G and G wins against F.

Access entitlement server 140 may obtain the derived geographic location of user 155 with the request (from user device 105) to access the data associated with networking device 135(1). Access entitlement server 140 may identify access policy 150, which may control access to data associated with networking device 135(1) based on the geographic location of networking device 135(1), one or more user parameters (e.g., the geographic location of user 155, the citizenship of user 155, etc.), and/or the LBAC label of networking device 135(1).

Based on the geographic location of networking device 135(1), one or more user parameters, access policy 150, and/or the LBAC label of networking device 135(1), access entitlement server 140 may permit or deny the request to access the data. For example, access entitlement server 140 may generate an entitlement value (e.g., deny, limited access—read/write, etc.) based on information received from device manager 130 (e.g., hosted device and services) as well as local and customer-specific rules. The entitlement value may be converted to a specific access type or Terminal Access Controller Access-Control System plus (TACACS+) based authorization.

Access entitlement server 140 may process access policy 150 to generate the access entitlement authorization based on different inputs/components from SaaS cloud 120, device manager 130, third-party rule databases, MFA server 110, etc. Access entitlement server 140 may be integrated in, and interact with, the authentication MFA workflow to consume the entitlement value. As a result, access entitlement server 140 may process the request from MFA server 110 based on both user and service location, and return the authorization (if appropriate) back to MFA server 110. If authenticated and authorized based on the access policy 150, location information, etc., user 155 may be allowed to access networking device 135(1) and/or configuration data associated with networking device 135(1) based on the entitlement value provided by access entitlement server 140. Access entitlement server 140 may grant access to only select portions of a network in adherence with access policy 150.

In one example, user 155 may be a computer networking engineer who is trying to access networking device 135(1) (e.g., a customer networking device). The engineer may be validated and authorized using a location-aware MFA process that validates the physical location of the engineer. Access entitlement server 140 may check the LBAC label of networking device 135(1), access policy 150 (e.g., a customer-defined policy), and other regulations. Access entitlement server 140 may further generate the entitlement value and pass the entitlement value to MFA server 110 for proper authorization. If access policy 150 allows a person from the engineer's country or region to manage networking device 135(1), and the engineer is validated with the correct credentials, permission may be granted.

Access entitlement server 140 may audit which users (e.g., user 155) accessed which networking devices (e.g., networking devices 135(1)-135(3)), what actions were performed by the users, etc., to ensure compliance with access policy 150. This may help assure the entity associated with access policy 150 that access policy 150 is being met for managed networks/services.

Access entitlement server 140 may also control how network traffic is routed based on access policy 150 using additional parameters. Access entitlement server 140 may, for example, use Border Gateway Protocol (BGP) peering and routing techniques to route the network traffic.

Figure 2:
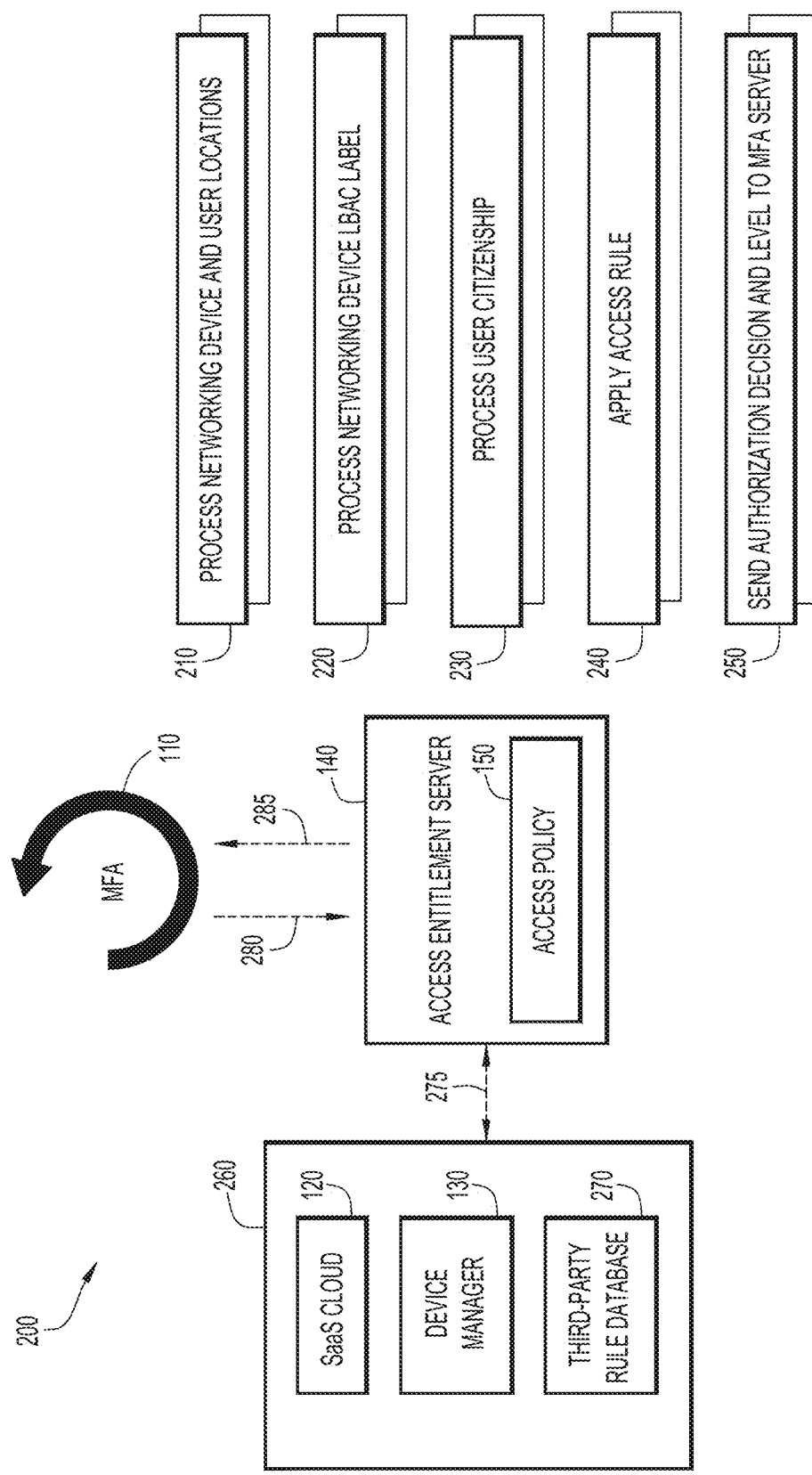
FIG. 2 illustrates a workflow for controlling access entitlement for a networking device, according to an example embodiment.

With continuing reference to FIG. 1, FIG. 2 illustrates an example workflow 200 for controlling access entitlement for networking device 135(1). Workflow 200 illustrates operations 210-250 performed by access entitlement server 140. Inputs 260 to access entitlement server 140 may include SaaS cloud 120, device manager 130, and third-party rule database 270. In this example, user 155 has sent a request (via user device 105) to access networking device 135(1).

At operation 210, access entitlement server 140 processes the locations of networking device 135(1) and user 155. Access entitlement server 140 may obtain the location of networking device 135(1) from device manager 130, as represented by arrow 275. Access entitlement server 140 may process the location of user 155 based on the location of user device 105. Access entitlement server 140 may obtain the location of user device 105 from MFA server 110, as represented by arrow 280.

At operation 220, access entitlement server 140 processes the LBAC label of networking device 135(1). Access entitlement server 140 may obtain the LBAC label of networking device 135(1) from SaaS cloud 120 and/or device manager 130, as represented by arrow 275. At operation 230, access entitlement server 140 processes the citizenship of user 155. At operation 240, access entitlement server 140 applies access policy 150. Access entitlement server 140 may apply access policy 150 based on the location of networking device 135(1), the location of user device 105/user 155, the LBAC label of networking device 135(1), and the citizenship of user 155.

At operation 250, access entitlement server 140 sends the authorization decision and level to MFA server 110, as represented by arrow 285. The authorization decision may indicate whether user 155 is permitted to access networking device 135(1). MFA server 110 may, in turn, perform an enforcement action on user device 105. For example, if user device 105 is permitted access, the enforcement action may include moving user device 105 onto a specific Virtual Local Area Network (VLAN). If user device 105 is denied access, the enforcement action may include quarantining user device 105 from networking device 135(1) and/or other components of the network. MFA server 110 may perform any suitable enforcement action.

Figure 3:
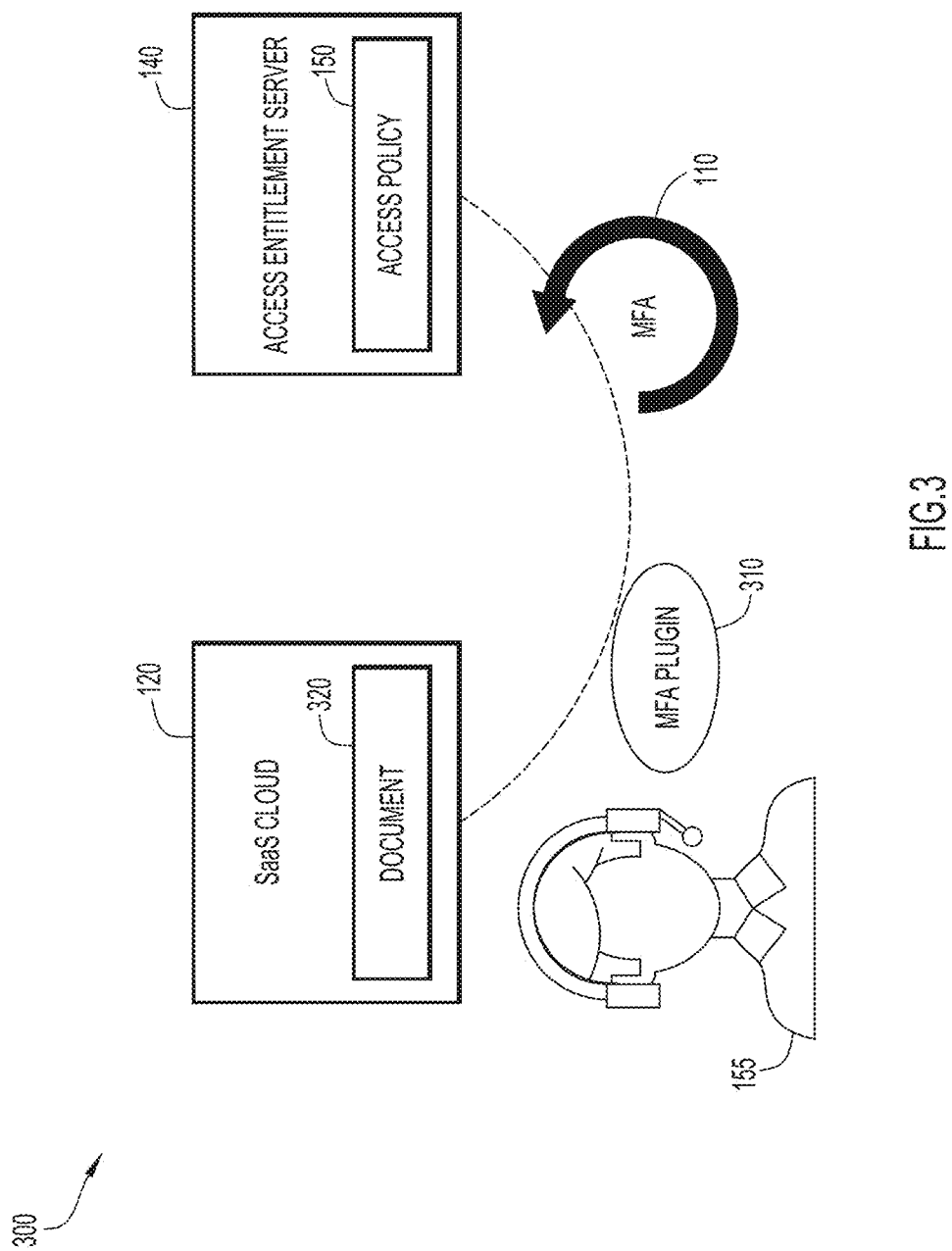
FIG. 3 illustrates a workflow for controlling access entitlement for data previously downloaded from a networking device, according to an example embodiment.

With continuing reference to FIG. 1, FIG. 3 illustrates an example workflow 300 for controlling access entitlement for data previously downloaded from networking device 135(1). Workflow 300 may include operations performed by SaaS cloud 120, MFA plugin 310, MFA server 110, and access entitlement server 140. MFA plugin 310 may run on user device 105 and communicate with MFA server 110 on behalf of user device 105.

SaaS cloud 120 includes document 320, which may be encrypted. Document 320 may include data that was previously downloaded from networking device 135(1) and is now stored in SaaS cloud 120. Document 320 may include any suitable data that is downloadable from networking device 135(1), such as configuration information of networking device 135(1).

Access entitlement server 140 (and/or device manager 130) may assign an LBAC label to document 320. The LBAC label assigned to document 320 may be the same LBAC label assigned to networking device 135(1). For instance, when the configuration data is downloaded from networking device 135(1) and document 320 is created, the LBAC label assigned to networking device 135(1) may automatically attach to document 320. Document 320 may also be marked with a corresponding policy (e.g., access policy 150).

In this example, user 155 sends a request (via user device 105) to access document 320. MFA server 110 receives the request and invokes MFA plugin 310 to request user 155 for authentication information and obtain the physical/geographic location of user 155. The physical location of user 155 may be obtained/derived as described above. MFA server 110 may fetch the details about the geographic location of user 155 and other user parameters, which may be stored in an active directory.

MFA server 110 may provide the user parameter(s) to access entitlement server 140. Access entitlement server 140 identifies access policy 150, which controls access to the data based on the geographic location of networking device 135(1), the user parameter(s), and/or the LBAC label of document 320. Based on the geographic location of networking device 135(1), the user parameter(s), the LBAC label of document 320, and/or access policy 150, access entitlement server 140 may permit or deny the request to access the data. For example, access entitlement server 140 may share the entitlement value with MFA server 110 for access processing (e.g., decrypting document 320 for access by user 155). Thus, access entitlement/validation may be triggered for existing data/configuration files such as document 320 before user 155 is permitted to open document 320.

Different policies may apply to configuration file documents and corresponding networking devices. For example, access entitlement server 140 may define one access policy (or set of access policies) for configuration file documents, and another access policy (or set of access policies) for the networking devices from which the configuration file documents are obtained.

Described herein are techniques to provide data access entitlement for a network or service. Data access entitlement may be used for data sovereignty applications and ensuring compliance to local and regulatory laws pertaining to data access. Authorized access may be provided to devices/services based on a unique combination of user/service location, identity, other policy-related functions such as citizenship, etc. Dynamic policy-based access may be provided for networking devices and services by using a unique access entitlement-based method that applies user and device location, requester reputation, criticality of device, and service with a policy framework included as part of a MFA system.

Techniques described herein may apply to other document-based use cases, such as legal documents that are subject to access control. Similar techniques may also apply to non-document-based use cases, such as other file types, such as photos, videos, streaming video, etc. For instance, similar techniques may be invoked when a user requests to stream video content.

Figure 4:
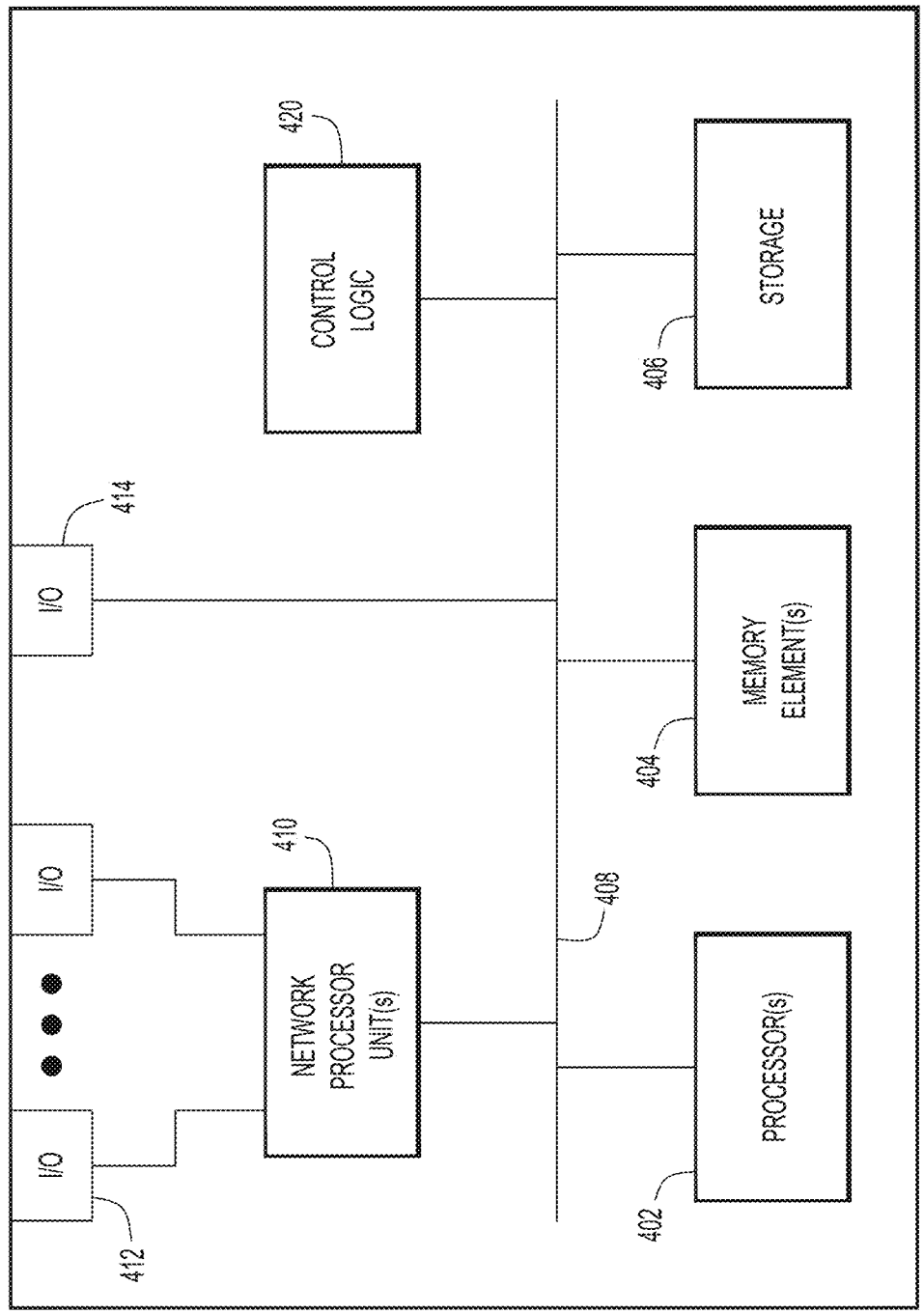
FIG. 4 illustrates a hardware block diagram of a computing device configured to perform functions associated with operations discussed herein, according to an example embodiment.

Referring to FIG. 4, FIG. 4 illustrates a hardware block diagram of a computing device 400 that may perform functions associated with operations discussed herein in connection with the techniques depicted in FIGS. 1-3. In various embodiments, a computing device, such as computing device 400 or any combination of computing devices 400, may be configured as any entity/entities as discussed for the techniques depicted in connection with FIGS. 1-3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor.'

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 400 for transfer onto another computer readable storage medium.

Figure 5:
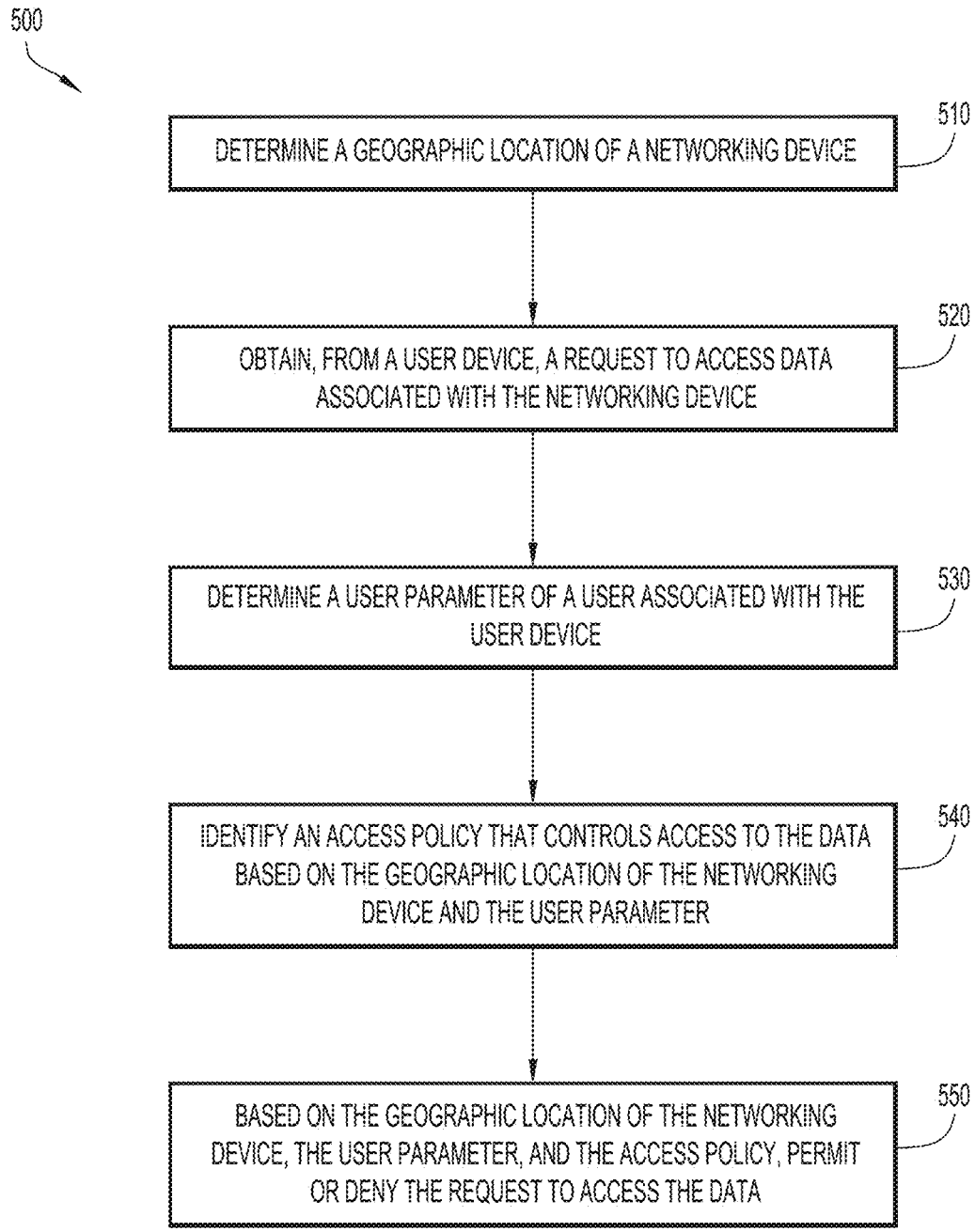
FIG. 5 illustrates a flowchart of a method for performing functions associated with operations discussed herein, according to an example embodiment.

FIG. 5 is a flowchart of an example method 500 for performing functions associated with operations discussed herein. Method 500 may be performed by any suitable entity, such as access entitlement server 140, MFA server 110, device manager 130, computing device 400, etc. At operation 510, a geographic location of a networking device is determined. At operation 520, a request to access data associated with the networking device is obtained from a user device. At operation 530, a user parameter of a user associated with the user device is determined. At operation 540, an access policy that controls access to the data based on the geographic location of the networking device and the user parameter is identified. At operation 550, the request to access the data is permitted or denied based on the geographic location of the networking device, the user parameter, and the access policy.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided. The method comprises: determining a geographic location of a networking device; obtaining, from a user device, a request to access data associated with the networking device; determining a user parameter of a user associated with the user device; identifying an access policy that controls access to the data based on the geographic location of the networking device and the user parameter; and based on the geographic location of the networking device, the user parameter, and the access policy, permitting or denying the request to access the data.

In one example, the method further comprises: obtaining a label indicating a target access control level for the networking device, wherein: identifying the access policy that controls access to the data is based further on the label; and permitting or denying the request to access the data is based further on the label. In a further example, obtaining the label includes: obtaining a label assigned based on a topological location of the networking device in a network.

In one example, determining the user parameter of the user includes: determining a geographic location of the user. In a further example, determining the geographic location of the user includes: obtaining, from a plurality of sources, a plurality of candidate geographic locations of the user; comparing each of the plurality of candidate geographic locations against each other candidate geographic location of the plurality of candidate geographic locations; and in response to comparing each of the plurality of candidate geographic locations against each other candidate geographic location of the plurality of candidate geographic locations, deriving the geographic location of the user. In another further example, determining the geographic location of the user includes: obtaining an indication of the geographic location of the user from a multi-factor authentication process.

In one example, determining the user parameter of the user includes: determining a citizenship of the user.

In one example, obtaining the request to access the data associated with the networking device includes: obtaining a request to access the networking device.

In one example, obtaining the request to access the data associated with the networking device includes: obtaining a request to access data that was previously downloaded from the networking device. In a further example, the method further comprises: assigning, to the data, a label indicating a target access control level for the data, wherein: identifying the access policy that controls access to the data is based further on the label; and permitting or denying the request to access the data is based further on the label.

In another form, an apparatus is provided. The apparatus comprises: a network interface configured to obtain or provide network communications; and one or more processors coupled to the network interface, wherein the one or more processors are configured to: determine a geographic location of a networking device; obtain, from a user device, a request to access data associated with the networking device; determine a user parameter of a user associated with the user device; identify an access policy that controls access to the data based on the geographic location of the networking device and the user parameter; and based on the geographic location of the networking device, the user parameter, and the access policy, permit or deny the request to access the data.

In another form, one or more non-transitory computer readable storage media are provided. The non-transitory computer readable storage media are encoded with instructions that, when executed by a processor, cause the processor to: determine a geographic location of a networking device; obtain, from a user device, a request to access data associated with the networking device; determine a user parameter of a user associated with the user device; identify an access policy that controls access to the data based on the geographic location of the networking device and the user parameter; and based on the geographic location of the networking device, the user parameter, and the access policy, permit or deny the request to access the data.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    determining a geographic location of a networking device;
    obtaining, from a user device, a request to access data associated with the networking device;
    obtaining a label indicating a target access control level for the networking device;
    determining a user parameter of a user associated with the user device;
    identifying an access policy that controls access to the data based on the geographic location of the networking device, the user parameter and the label; and
    based on the geographic location of the networking device, the user parameter, and the access policy, permitting or denying the request to access the data.

2. The method of claim 1, wherein obtaining the label includes:
    obtaining a label assigned based on a topological location of the networking device in a network.

3. The method of claim 1, wherein determining the user parameter of the user includes:
    determining a geographic location of the user.

4. The method of claim 3, wherein determining the geographic location of the user includes:
    obtaining, from a plurality of sources, a plurality of candidate geographic locations of the user;
    comparing each of the plurality of candidate geographic locations against each other candidate geographic location of the plurality of candidate geographic locations; and
    in response to comparing each of the plurality of candidate geographic locations against each other candidate geographic location of the plurality of candidate geographic locations, deriving the geographic location of the user.

5. The method of claim 3, wherein determining the geographic location of the user includes:
    obtaining an indication of the geographic location of the user from a multi-factor authentication process.

6. The method of claim 1, wherein determining the user parameter of the user includes:
    determining a citizenship of the user.
7. The method of claim 1, wherein obtaining the request to access the data associated with the networking device includes:
    obtaining a request to access the networking device.
8. The method of claim 1, wherein obtaining the request to access the data associated with the networking device includes:
    obtaining a request to access data that was previously downloaded from the networking device.
9. The method of claim 8, further comprising:
    assigning, to the data, a label indicating a target access control level for the data, wherein:
    identifying the access policy that controls access to the data is based further on the label; and
    permitting or denying the request to access the data is based further on the label.
10. An apparatus comprising:
    a network interface configured to obtain or provide network communications; and
    one or more processors coupled to the network interface, wherein the one or more processors are configured to:
        determine a geographic location of a networking device;
        obtain, from a user device, a request to access data associated with the networking device;
        obtain a label indicating a target access control level for the networking device;
        determine a user parameter of a user associated with the user device;
        identify an access policy that controls access to the data based on the geographic location of the networking device, the user parameter and the label; and
        based on the geographic location of the networking device, the user parameter, and the access policy, permit or deny the request to access the data.
11. The apparatus of claim 10, wherein the one or more processors are configured to:
    obtain a label assigned based on a topological location of the networking device in a network.
12. The apparatus of claim 10, wherein the one or more processors are configured to:
    determine a geographic location of the user.
13. The apparatus of claim 12, wherein the one or more processors are configured to determine the geographic location of the user by:
    obtaining, from a plurality of sources, a plurality of candidate geographic locations of the user;
    comparing each of the plurality of candidate geographic locations against each other candidate geographic location of the plurality of candidate geographic locations; and
    in response to comparing each of the plurality of candidate geographic locations against each other candidate geographic location of the plurality of candidate geographic locations, deriving the geographic location of the user.
14. The apparatus of claim 12, wherein the one or more processors are configured to determine the geographic location of the user by:
    obtaining an indication of the geographic location of the user from a multi-factor authentication process.
15. The apparatus of claim 10, wherein the one or more processors are configured to:
    determine a citizenship of the user.
16. One or more non-transitory computer readable storage media encoded with instructions that, when executed by a processor, cause the processor to:
    determine a geographic location of a networking device;
    obtain, from a user device, a request to access data associated with the networking device;
    obtain a label indicating a target access control level for the networking device;
    determine a user parameter of a user associated with the user device;
    identify an access policy that controls access to the data based on the geographic location of the networking device, the user parameter and the label; and
    based on the geographic location of the networking device, the user parameter, and the access policy, permit or deny the request to access the data.
17. The one or more non-transitory computer readable storage media of claim 16, wherein the instructions further cause the processor to:
    obtain a label assigned based on a topological location of the networking device in a network.
18. The one or more non-transitory computer readable storage media of claim 16, wherein the instructions further cause the processor to:
    determine a geographic location of the user.
19. The one or more non-transitory computer readable storage media of claim 18, wherein the instructions further cause the processor to determine the geographic location of the user by:
    obtaining, from a plurality of sources, a plurality of candidate geographic locations of the user;
    comparing each of the plurality of candidate geographic locations against each other candidate geographic location of the plurality of candidate geographic locations; and
    in response to comparing each of the plurality of candidate geographic locations against each other candidate geographic location of the plurality of candidate geographic locations, deriving the geographic location of the user.
20. The one or more non-transitory computer readable storage media of claim 16, wherein the instructions further cause the processor to:
    determine a citizenship of the user.

* * * * *